United States Patent
Inoue et al.

(10) Patent No.: US 10,550,027 B2
(45) Date of Patent: Feb. 4, 2020

(54) METHOD FOR PRODUCING MEDICAL GLASS CONTAINER IN WHICH OCCURRENCE OF CRACKING IS REDUCED

(71) Applicant: Nipro Corporation, Osaka-shi, Osaka (JP)

(72) Inventors: Yoshio Inoue, Osaka (JP); Kazuhisa Moriuchi, Osaka (JP); Yoshihiro Kawai, Osaka (JP); Atsushi Ishikawa, Osaka (JP)

(73) Assignee: NIPRO CORPORATION (JP)

( * ) Notice: Subject to any disclaimer, the term of this patent is extended or adjusted under 35 U.S.C. 154(b) by 71 days.

(21) Appl. No.: 15/567,624

(22) PCT Filed: Apr. 21, 2016

(86) PCT No.: PCT/JP2016/062588
§ 371 (c)(1),
(2) Date: Oct. 19, 2017

(87) PCT Pub. No.: WO2016/171196
PCT Pub. Date: Oct. 27, 2016

(65) Prior Publication Data
US 2018/0111867 A1    Apr. 26, 2018

(30) Foreign Application Priority Data

Apr. 24, 2015   (JP) .................................. 2015-089622

(51) Int. Cl.
*C03B 32/00*     (2006.01)
*A61J 1/06*      (2006.01)
(Continued)

(52) U.S. Cl.
CPC ................. *C03B 32/00* (2013.01); *A61J 1/06* (2013.01); *C03B 29/02* (2013.01); *C03C 23/007* (2013.01)

(58) Field of Classification Search
CPC .............. C03B 23/043; C03B 23/0046; C03B 37/01251; C03B 32/00
(Continued)

(56) References Cited

U.S. PATENT DOCUMENTS 2,392,104 A * 1/1946 Smith ..................... A61M 5/00
                                                    604/218
5,322,542 A * 6/1994 Ogata ..................... C03B 29/02
                                                    219/383

(Continued)

OTHER PUBLICATIONS

"Modern Judiciary Technology Dictionary", 1st edition, Dong Guangdou, p. 834 Guizhou People's Publishing House, Mar. 1998.

*Primary Examiner* — Cynthia Szewczyk
(74) *Attorney, Agent, or Firm* — Jordan and Koda, PLLC

(57) ABSTRACT

[Object] To provide a means manufacturing a medical glass container with less generation of a crack.

[Solution] A method for manufacturing a medical glass container includes a first process of moving the tip of an ignited point burner 30 from a standby position where a flame 31 does not contact a vial 10 to a position where the tip of the ignited point burner 30 faces an opening 16 in the outside of the vial 10, a second process of inserting the tip of the point burner 30 into an internal space 14 of the vial 10, a third process of applying the flame 31 to an inner surface 15 of the vial 10 while holding the tip of the point burner 30 in the internal space 14, a fourth process of moving the tip of the point burner 30 to the outside from the internal space 14, and a fifth process of moving the tip of the point burner 30 from the position where the tip of the point burner 30 faces the opening 16 to the standby position. At least in the second process and the fourth process, the flame 31 having heating power weaker than the heating power of (Continued)

the flame 31 of the point burner 30 applied to the inner surface of the vial 10 in the third process is ejected from the point burner 30.

11 Claims, 6 Drawing Sheets

(51) Int. Cl.
*C03B 29/02* (2006.01)
*C03C 23/00* (2006.01)

(58) Field of Classification Search
USPC .............................................................. 65/65
See application file for complete search history.

(56) References Cited

U.S. PATENT DOCUMENTS

| | | |
|---|---|---|
| 2009/0099000 A1 | 4/2009 | Kuwabara et al. |
| 2010/0255229 A1 | 10/2010 | Wada |
| 2012/0247151 A1* | 10/2012 | Kelly ..................... C03B 29/02 |
| | | 65/29.1 |
| 2016/0016841 A1* | 1/2016 | Frost ....................... C03B 21/06 |
| | | 65/29.1 |
| 2016/0168005 A1* | 6/2016 | Gromann ................. C03C 3/06 |
| | | 65/109 |

* cited by examiner

METHOD FOR PRODUCING MEDICAL GLASS CONTAINER IN WHICH OCCURRENCE OF CRACKING IS REDUCED

BACKGROUND OF THE INVENTION

The present invention relates to a method for manufacturing a medical glass container with less generation of a crack.

As raw materials of a medical glass container, such as a medical vial, borosilicate glass excellent in chemical durability has been used in many cases. By heating and deforming a glass tube containing borosilicate glass, a mouth portion and a bottom portion of a vial are molded. When the borosilicate glass is heated, alkaline components contained in the borosilicate glass are volatilized. The volatilized alkaline components condense particularly on the inner surface near the bottom portion of the vial to generate a region deteriorated by processing. Such a region deteriorated by processing has a possibility of causing the elution of the alkaline components into a pharmaceutical agent and the like to be stored in the vial. To address the problem, the alkaline component elution standard is established in ISO4802-1 or ISO4802-2 and the like.

As a method for reducing the elution of alkaline components, a method is known which includes subjecting a deteriorated glass generated in the inner surface of a vial molded from a glass tube to fire blasting with an oxygen-gas flame by a point burner while rotating the vial (Patent Literatures 1 and 2).

CITATION LIST

Patent Literatures

[Patent Literature 1] International Publication No. WO2006/123621
[Patent Literature 2] Japanese Unexamined Patent Application Publication No. 2010-269973

SUMMARY OF INVENTION

Technical Problems

In the fire blasting, in order to adjust a flame ejected from a nozzle of a point burner to the optimal position, it is preferable to insert the nozzle of the point burner into the internal space of a vial. When the nozzle of the point burner is inserted into the tip of the vial, the tip of the nozzle approaches an opening of the vial. Herein, the vicinity of the opening of the vial is heated by the flame ejected from the nozzle of the point burner. The present inventors have found that, due to the heating of the vicinity of the opening of the vial, the generation of a crack is likely to occur near the opening of a glass container.

The present invention has been made in view of the above-described circumstances. It is an object of the present invention to provide a means which is hard to cause the generation of a crack in a medical glass container which is molded using a glass tube containing borosilicate glass as a raw material in a method for manufacturing the medical glass container.

Solution to Problems (1) A method for manufacturing a medical glass container according to the present invention includes a first process of moving the tip of an ignited point burner from a position where a flame ejected from the tip of the point burner does not contact the glass container to a position which is located outside the glass container and in which the tip of the point burner faces an opening of the glass container, a second process of inserting the tip of the ignited point burner into the internal space of the glass container through the opening, a third process of applying the flame ejected from the tip of the point burner to the inner surface of the glass container while holding the tip of the point burner in the internal space of the glass container, a fourth process of moving the tip of the ignited point burner to the outside from the internal space of the glass container through the opening, and a fifth process of moving the tip of the ignited point burner from the position where the tip of the ignited point burner faces the opening of the glass container to the position where the flame ejected from the tip of the point burner does not contact the glass container, in which the flame ejected from the point burner at least in the second process and the fourth process has heating power weaker than the heating power of the flame of the point burner applied to the inner surface of the glass container in the third process.

In the glass container molding process, a region deteriorated by processing is generated in the inner surface of the glass container. In the third process, the tip of the point burner is located in the internal space of the glass container, and then the flame ejected from the tip of the point burner is applied to the inner surface of the glass container. Thus, the region deteriorated by processing is removed from the inner surface of the glass container.

The flame ejected from the point burner in the second process and the fourth process has heating power weaker than the heating power of the flame of the point burner applied to the inner surface of the glass container in the third process. Thus, when the tip of the point burner passes through the opening of the glass container, the quantity of heat added to the vicinity of the opening of the glass container can be reduced.

(2) Preferably, at least in the first process and the fifth process, a shielding mechanism is located near the opening of the glass container so as to prevent the flame ejected from the tip of the point burner from contacting the glass container by the shielding mechanism.

In the first process and the fifth process, the tip of the point burner is located outside the glass container and is rotated between the position near the opening of the glass container and the position where the flame does not contact the glass container. Herein, the shielding mechanism prevents the flame ejected from the tip of the point burner from contacting the glass container.

(3) Preferably, the glass container is supported so that the opening of the glass container faces upward relative to the horizontal direction in each of the above-described processes and the point burner is moved with respect to the glass container with a nozzle configuring the tip of the point burner along a direction parallel to the axis line of the glass container at least in the second process and the fourth process.

Thus, the tip of the point burner moves in parallel to the axis line of the glass container between the outside and the inside of the glass container. The flame ejected from the tip of the point burner is ejected in a direction parallel to the axis line of the glass container. When the tip of the point burner passes through the vicinity of a neck portion of the glass container, the flame can be prevented from contacting the inner surface near the opening of the glass container. Moreover, the glass container is supported so that the opening of the glass container faces upward relative to the horizontal direction, and therefore the glass container does not move in the horizontal direction and is maintained at a stable position.

(4) Preferably, in the third process, the glass container is supported with a pair of rollers, and the glass container is rotated by the rotation of the rollers while applying the flame ejected from the tip of the point burner to the inner surface of the glass container.

Thus, the flame is uniformly applied in the circumferential direction on the inner surface of the glass container.

(5) Preferably, a shielding plate capable of blocking the flame ejected from the tip of the point burner is used as the shielding mechanism and the shielding plate is located between a part of an edge portion defining the opening of the glass container and the tip of the point burner in the first process and the fifth process.

Thus, the shielding mechanism having a simple configuration is realized.

(6) Preferably, the shielding plate is located between the upper side of the edge portion of the glass container and the tip of the point burner in the first process and the fifth process.

(7) Preferably, the tip of the point burner is moved with respect to the glass container by rotating the point burner in the first process and the fifth process.

Thus, in the first process and the fifth process, the movement distance of the point burner with respect to the axial direction of the glass container becomes short and the tip of the point burner is greatly separated from the glass container.

Advantageous Effects of Invention

According to the present invention, in a method for manufacturing a medical glass container molded from a glass tube containing borosilicate glass, a region deteriorated by processing can be removed using a flame of a point burner and the generation of a crack in the medical glass container can be prevented.

DESCRIPTION OF EMBODIMENTS

Hereinafter, a preferable embodiment of the present invention is described. It is a matter of course that this embodiment is merely one embodiment of the present invention and the embodiment can be altered in the range where the scope of the present invention is not altered.

[Outline of Fire Blasting Device 80]

Figure 1:
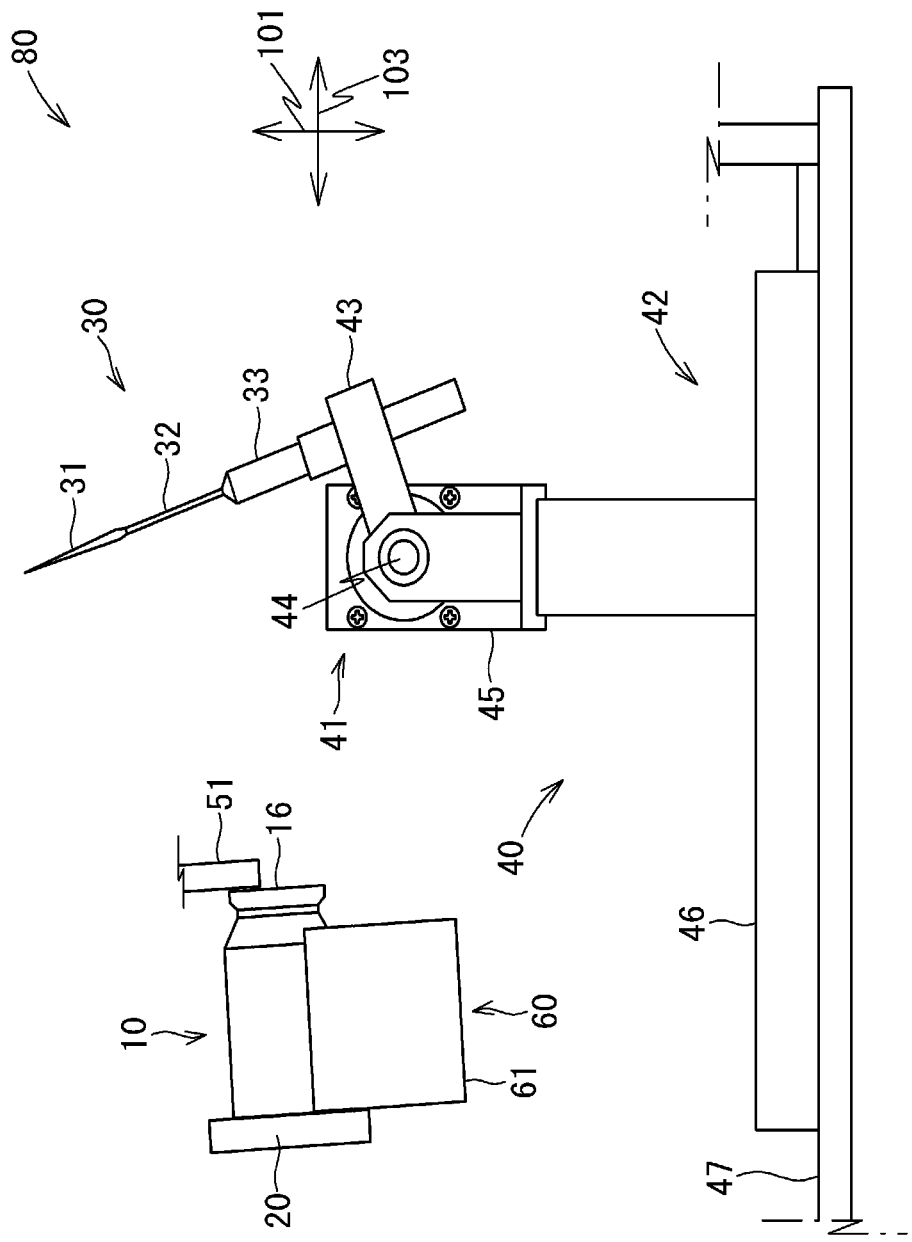
FIG. 1 is a schematic view of a fire blasting device 80 according to an embodiment of the present invention and illustrating a state where a point burner 30 is located at a standby position.

As illustrated in FIG. 1, a fire blasting device 80 has a point burner 30, a point burner moving device 40, a roller pair 60, and a shielding plate 51. The fire blasting device 80 is a device for performing fire blasting of a vial 10 (an example of a glass container). Hereinafter, constituent components of the fire blasting device 80 are described in detail. In the following description, a vertical direction 101 is defined on the basis of the upper and lower sides in FIG. 1, a left and right direction 102 is defined on the basis of a direction vertical to the sheet of FIG. 1, and a forward and backward direction 103 is defined as a direction vertical to the vertical direction 101 and the left and right direction 102.

[Point Burner 30]

Figure 2:
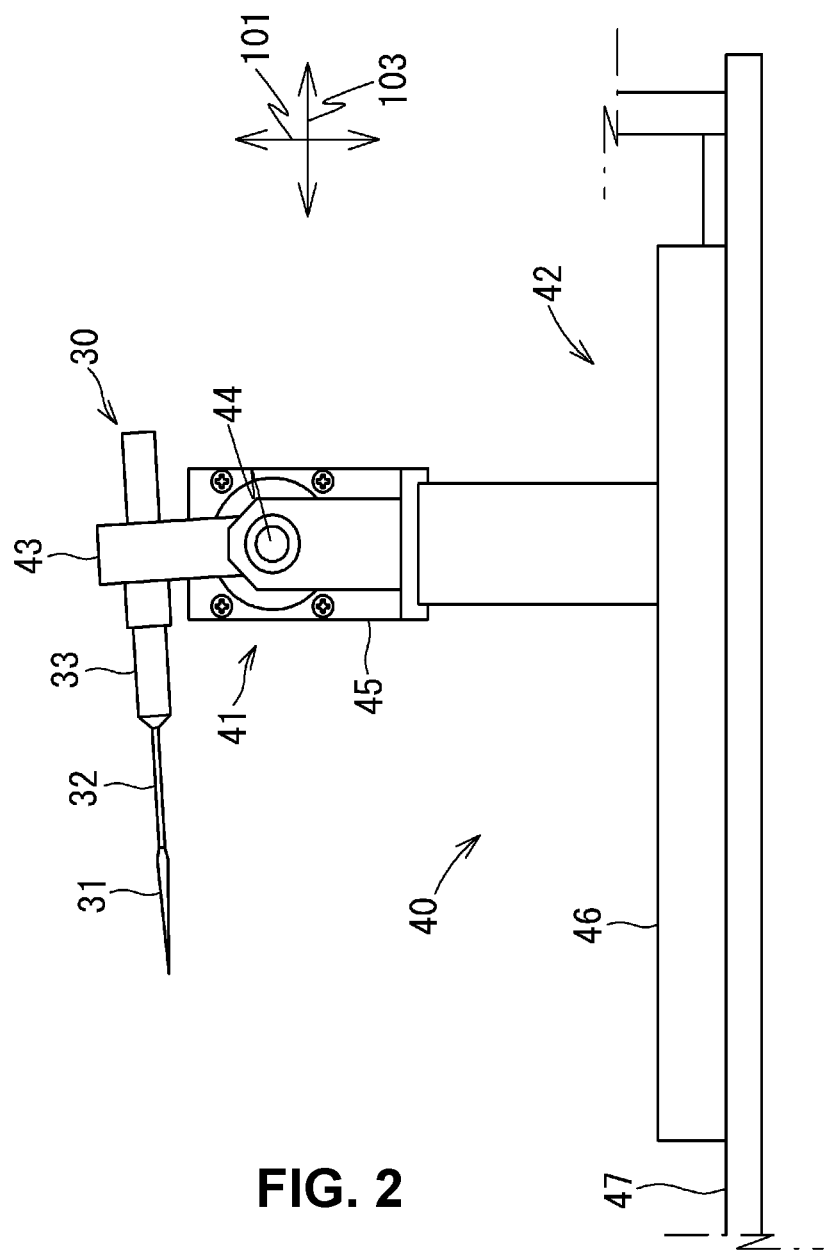
FIG. 2 is a schematic view of a point burner moving device 40 and illustrating a state where the point burner 30 is located along the horizontal direction (forward and backward direction 103).

As illustrated in FIG. 1 and FIG. 2, the point burner 30 has a burner body 33 and a nozzle 32 and is connected to cylinders and a flow rate control device (not illustrated).

The burner body 33 has an approximately cylindrical shape and flow passages through which inflammable gas, such as liquefied natural gas, and oxygen can individually flow and a flow passage through which a mixed gas, which is formed by joining of the flow passages, can flow are formed in the internal space. The burner body 33 is connected to each of a cylinder storing the inflammable gas and a cylinder storing the oxygen on the base end side. Between the burner body 33 and each cylinder, a flow rate control device (not illustrated) for controlling each of the inflammable gas flow rate and the oxygen flow rate is provided. A known device can be used for the flow rate control device.

The nozzle 32 is connected to the tip side of the burner body 33. The nozzle 32 has a straw shape and allows the mixed gas flowing out of the burner body 33 to pass therethrough. The outer diameter of the nozzle 32 is designed to have a thickness which allows the insertion of the nozzle 32 into an internal space 14 of the vial 10 and which allows the variation of the axial direction of the nozzle 32 in a state where the tip of the nozzle 32 is located in the internal space 14 of the vial 10. More specifically, the outer diameter of the nozzle 32 is sufficiently smaller than the internal diameter of a neck portion 18 of the vial 10. The length along the axial direction of the nozzle 32 is sufficiently larger than the length along the axial direction of the vial 10. As a raw material of the nozzle 32, one having high heat resistance, such as ceramic, is preferable, for example.

The mixed gas is caused to flow out to the outside from the tip of the nozzle 32, which is the tip of the point burner 30, through the internal space of the nozzle 32 from the internal space of the burner body 33. Due to the fact that the mixed gas flowing out to the outside from the tip of the nozzle 32 is ignited, a flame is ejected from the tip of the point burner 30. The heating power of the flame 31 ejected from the tip of the point burner 30 is controllable by controlling the flow rate of each of the gas and the oxygen by the flow rate control device. The strength of the heating power is generally defined by the quantity of heat (kcal/h) per hour.

[Point Burner Moving Device 40]

The point burner moving device 40 is a device for moving the point burner 30 relatively to the vial 10. As illustrated in FIG. 1, the point burner moving device 40 has a rotating device 41, a sliding device 42, and a burner support portion 43.

The rotating device 41 has a rotation shaft 44, a rotation shaft support portion 45, and a driving device for rotation (not illustrated). The rotation shaft 44 is rotatably supported with the axial direction along the left and right direction 102 by the rotation shaft support portion 45. The burner support portion 43 is fixed to the rotation shaft 44. The point burner 30 is connected to the rotation shaft 44 through the burner support portion 43. By the rotation of the rotation shaft 44, the point burner 30 rotates around the rotation shaft 44 together with the burner support portion 43. Although not illustrated in the figures, driving force is input into the rotation shaft 44 from a driving source, such as a stepping motor. By controlling the direction and the amount of rotations of the driving source, the point burner 30 is rotated to a desired rotating position.

The sliding device 42 has a slide portion 46, a slide portion support base 47, and a drive device for sliding (not illustrated). The slide portion 46 is placed on the upper surface of the slide portion support base 47 so as to be slidable in the forward and backward direction 103. Although not illustrated in detail in each figure, a guide along the forward and backward direction 103 is provided on the upper surface of the slide portion support base 47, and the slide portion 46 is guided in the forward and backward direction 103 by the guide. Driving force is input into the slide portion 46 from the driving source, such as a stepping motor. Due to the fact that the direction in the forward and backward direction 103 and the drive amount of the driving force to be supplied from the driving source are controlled, the slide portion 46 is slid to a desired position with respect to the forward and backward direction 103. With the slide of the slide portion 46, the rotation shaft support portion 45 and the point burner 30 move.

The position of the point burner 30 illustrated in FIG. 1 is a standby position. At the standby position, the point burner 30 is located in an approximately right direction in FIG. 1 relative to the rotation shaft 44 and is located at a position distant from the vial 10. A flame 31 ejected from the tip of the nozzle 32 of the point burner 30 approximately faces upward and is located at a position where the flame 31 does not contact the vial 10. By the counterclockwise rotation of the rotation shaft 44, the point burner 30 is movable to a slide position illustrated in FIG. 2. At the slide position, the axial direction of the point burner 30 may slightly tilt with respect to the horizontal direction (forward and backward direction 103). The axial direction of the point burner 30 is parallel to the axis line of the roller pair 60 and the vial 10 described later. In the tip of the nozzle 32 of the point burner 30, the axis line tilts with respect to the horizontal direction (forward and backward direction 103) so that the tip of the nozzle 32 of the point burner 30 is located below relative to the base end side. The axis line of the nozzle 32 tilts by 0 to 10° with respect to the horizontal direction (forward and backward direction 103). The tip of the nozzle 32 of the point burner 30 is located at a position where tip of the nozzle 32 of the point burner 30 faces the opening 16 of the vial 10 in the outside of the vial 10. By the clockwise rotation of the rotation shaft 44 from the slide position, the point burner 30 is movable to the standby position from the slide position.

[Roller Pair 60]

As illustrated in FIG. 3(A) and FIG. 3(B), the roller pair 60 includes a pair of a first roller 61 and a second roller 62. The first roller 61 and the second roller 62 are disposed in parallel along the left and right direction 102 in a state where the rotation axes slightly tilt with respect to the forward and backward direction 103. The axis lines of the first roller 61 and the second roller 62 tilt with respect to the horizontal direction (forward and backward direction 103) so that the surface facing the point burner 30 faces upward relative to the opposite side. The axis lines of the roller pair 60 tilt by 0 to 10° with respect to the horizontal direction (forward and backward direction 103). The interval between the first roller 61 and the second roller 62 is sufficiently narrower than the outer diameter of the vial 10. The vial 10 is placed on the roller pair 60 so that the outer peripheral surface of the vial 10 contacts the outer peripheral surfaces of both the first roller 61 and the second roller 62. The axis line of the vial 10 placed on the roller pair 60 is parallel to the axis lines of the first roller 61 and the second roller 62. When the first roller 61 and the second roller 62 rotate in the same direction in this state, the vial 10 placed on the roller pair 60 is rotated around the axis line of the vial 10. Although not illustrated in each figure, driving force is input into the first roller 61 and the second roller 62 from a driving source, such as a motor. In each figure, a support mechanism rotatably supporting the roller pair 60 is omitted.

The roller pair 60 is provided with a back plate 20 on a side opposite to the point burner 30 in the forward and backward direction 103. The back plate 20 is a flat plate in which the surface on the side of the roller pair 60 is flat and is disposed so as to project upward relative to the roller pair 60. The back plate 20 can abut on a bottom portion 11 of the vial 10 placed on the roller pair 60. With the back plate 20, the bottom portion of the vial 10 placed on the roller pair 60 is positioned with respect to the forward and backward direction 103.

[Shielding Plate 51]

A shielding plate 51 is an example of the shielding mechanism. As illustrated in FIG. 3(A) and FIG. 3(B), the shielding plate 51 is a flat plate which is thin in the forward and backward direction 103. The shielding plate 51 has a trapezoid shape which narrows toward the lower side in the left and right direction 102. The width in the left and right direction 102 of the shielding plate 51 is designed to be larger than the outer diameter of the mouth portion 13 of the vial 10. The shielding plate 51 is located between the roller pair 60 and the point burner 30 in the forward and backward direction 103 so that either the front surface or the back surface spreads in the vertical direction 101 and the left and right direction 102. As illustrated in FIG. 3(A), the shielding plate 51 is tilted in the forward and backward direction 103 so as to be parallel to the edge portion 17 defining an opening 16 of the vial 10. The shielding plate 51 is disposed slightly above relative to the roller pair 60. The lower end of the shielding plate 51 is located slightly above relative to the center of the opening 16 of the vial 10 in the vertical direction 101. The surface on the side of the vial 10 of the shielding plate 51 faces a part of the upper side of an end surface having the edge portion 17 in the mouth portion 13 while approaching the part thereof.

The position of the shielding plate 51 is preferably movable according to the size of the vial 10 placed on the roller pair 60. Although not illustrated in detail in each figure, the shielding plate 51 is preferably movable with respect to the vertical direction 101. The position of the shielding plate 51 is adjusted to be located between a part of the upper side of the edge portion 17 defining the opening 16 of the vial 10 and the point burner 30 as described later. The flame 31 ejected from the tip of the point burner 30 is movable in the vertical direction 101 while contacting a central portion in the left and right direction 102 of the shielding plate 51 from the upper side to the lower side. As a raw material of the shielding plate 51, one blocking the flame 31 ejected from the tip of the point burner 30 may be acceptable, and metals, such as stainless steel, graphite having good thermal conductivity, and the like are mentioned.

[Vial 10]

Figure 3:
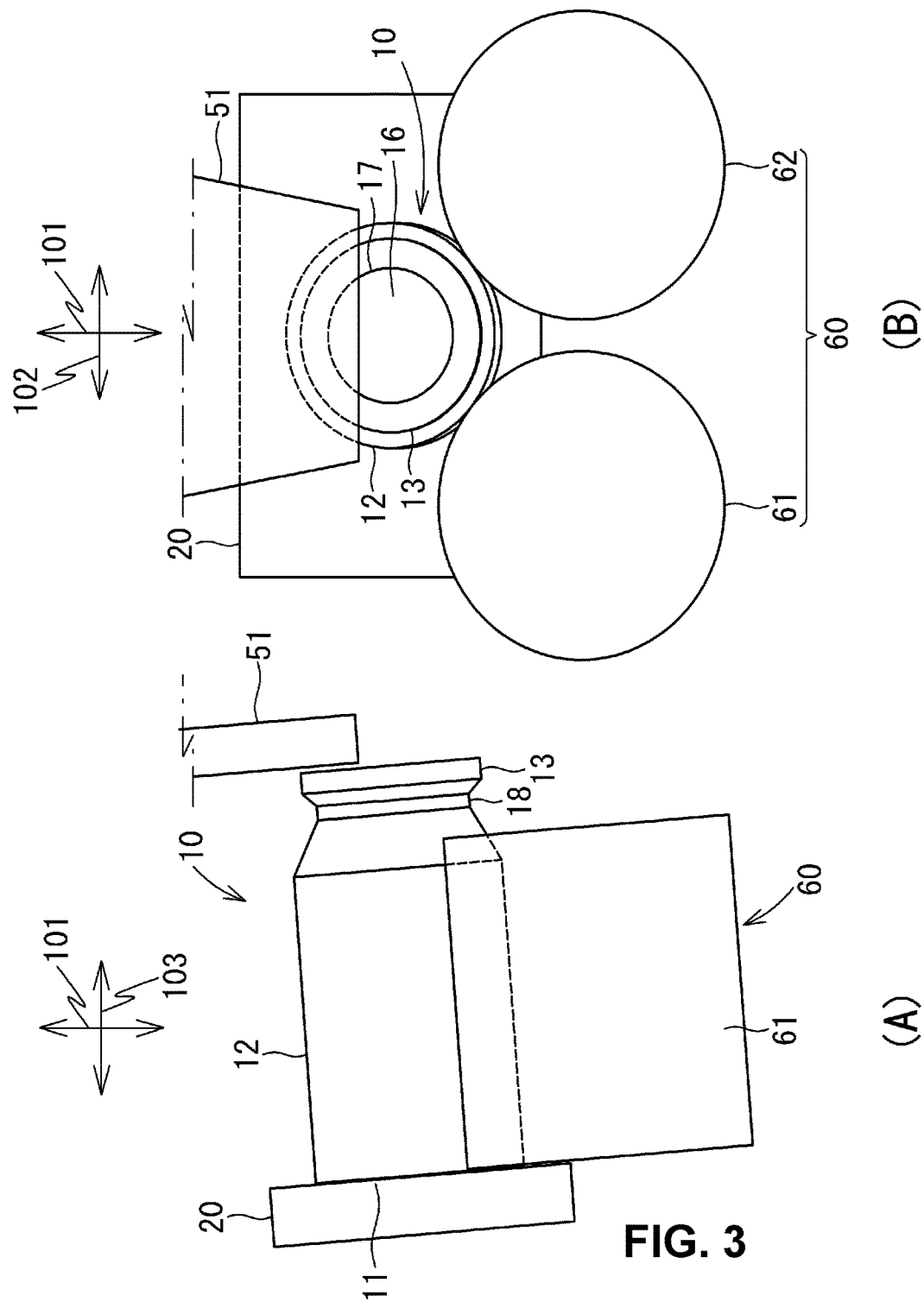
FIG. 3(A) and FIG. 3(B) are schematic views illustrating a state where a vial 10 is placed on a roller pair 60 and a part of a mouth portion 13 is blocked by a shielding plate 51.
Figure 4:
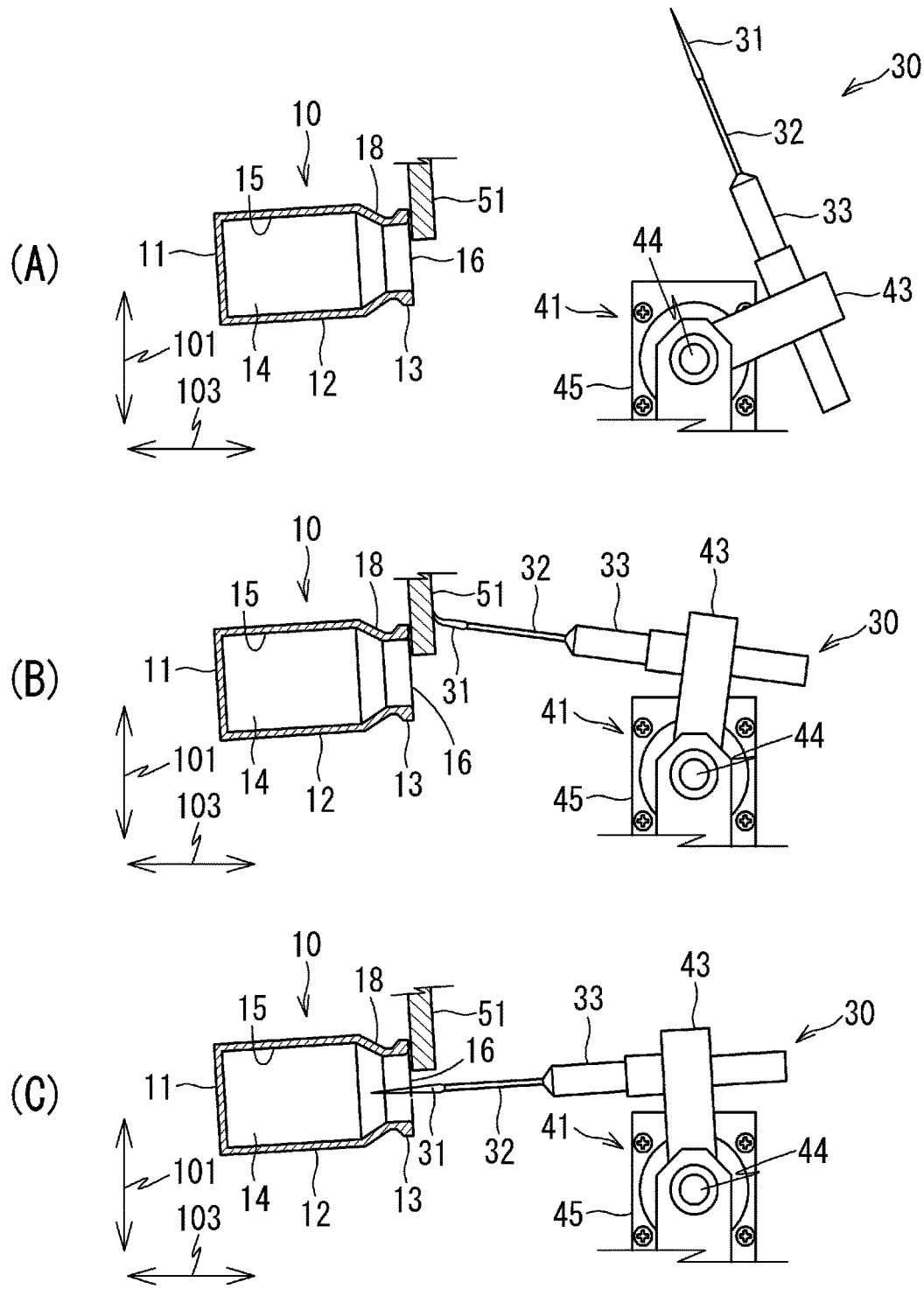
FIG. 4(A) is a view illustrating a state where the point burner 30 is located at a standby position in a first process.
FIG. 4(B) is a view illustrating a state where a flame 31 ejected from the tip of the point burner 30 is blocked by the shielding plate 51.
FIG. 4(C) is a view illustrating a state where a nozzle 32 of the point burner 30 is located along a direction parallel to the axis line of the glass container.

The vial 10 is an example of the medical glass container. As illustrated in FIG. 3 and FIG. 4, the vial 10 is a container having an approximately cylindrical outside shape with a closed bottom and has the bottom portion 11, a side surface portion 12, the neck portion 18, and the mouth portion 13 in order from the left side. The vial 10 has the internal space 14 and opens in one end of the mouth portion 13. The bottom portion 11 has a flat disk shape and is continuous to the side surface portion 12 in the edge of the bottom portion 11. The side surface portion 12 has a cylindrical shape. In the side surface portion 12, the outer diameter and the inner diameter are molded to be a fixed diameter in the axial direction. The neck portion 18 is continuous to the side surface portion 12 and narrows in a tapered shape from the side surface portion 12. The inner diameter and the outer diameter of the neck portion 18 are molded to be narrower than those of the side surface portion 12. The mouth portion 13 is continuous to the neck portion 18 and has the opening 16 defined by the edge portion 17. The inner diameter and the outer diameter of the mouth portion 13 are molded to be narrower than those of the side surface portion 12. The outer diameter of the mouth portion 13 is molded to be wider than that of a portion which is molded to be the narrowest in the outer diameter of the neck portion 18.

[Method for Manufacturing Vial 10]

A method for manufacturing the vial 10 mainly includes a container molding process and a fire blast process. The container molding process is a process of molding the vial 10 from a glass tube. The fire blast process is a process of applying the flame 31 ejected from the tip of the point burner 30 to a region deteriorated by processing in the inner surface 15 of the vial 10.

[Container Molding Process]

The vial 10 is molded by heating a glass tube, which is vertically held and rotates, using a common vertical molding device as an example. The glass tube is softened by being heated with a flame of a burner. Due to the fact that the glass tube is partially softened and deformed, the bottom portion 11 and the mouth portion 13 of the vial 10 are molded from the glass tube. When the bottom portion is molded, alkali borate and the like are volatilized from borosilicate glass as a raw material of the glass tube. Alkaline components, such as the volatilized alkali borate, adhere to the vicinity of the bottom portion 11 in the inner surface 15 of the vial 10 to generate a region deteriorated by processing. In order to remove the region deteriorated by processing, a fire blast process described in detail below is performed.

[Fire Blast Process]

A fire blasting device 80 is used in the fire blast process. The fire blast process mainly includes the following five processes:

(1) First process of moving the tip of the ignited point burner 30 from a position where the flame 31 ejected from the tip of the point burner 30 does not contact the vial 10 to a position which is located outside the vial 10 and in which the tip of the ignited point burner 30 faces the opening 16 of the vial 10;

(2) Second process of inserting the tip of the ignited point burner 30 into the internal space 14 of the vial 10 through the opening 16;

(3) Third process of applying the flame 31 ejected from the tip of the point burner 30 to the inner surface 15 of the vial 10 while holding the tip of the point burner 30 in the internal space 14 of the vial 10;

(4) Fourth process of moving the tip of the ignited point burner 30 to the outside from the internal space 14 of the vial 10 through the opening 16; and (5) Fifth process of moving the tip of the ignited point burner 30 from the position where the tip of the ignited point burner 30 faces the opening of the vial 10 to the position where the flame 31 ejected from the tip of the point burner 30 does not contact the vial 10.

As illustrated in FIG. 1, the vial 10 is placed on the rotated roller pair 60 before the first process. The vial 10 is rotated around the axis line of the vial 10 while the bottom portion 11 of the vial 10 abuts on the back plate 20. As illustrated in FIG. 3, the shielding plate 51 is moved to a position corresponding to the size of the vial 10 in the first process. More specifically, the shielding plate 51 is adjusted to be located between apart of the upper side of the edge portion 17 defining the opening 16 of the vial 10 and the point burner 30 in the forward and backward direction 103 and the vertical direction 101.

[First Process]

In the first process, the shielding plate 51 is located near the opening 16 of the vial 10. As illustrated in FIG. 4(A), the point burner 30 is located at a standby position in a state where fire blasting is not performed. At the standby position, the axis line of the nozzle 32 of the point burner 30 is tilted with respect to the horizontal direction (forward and backward direction 103) so that the tip thereof is located above relative to the vial 10 placed on the roller pair 60. The angle at which the axis line of the nozzle 32 is tilted with respect to the horizontal direction (forward and backward direction 103) is set according to the outside shape of the vial 10 or the length of the nozzle 32 and is about 70° as illustrated in FIG. 4(A), for example. The point burner 30 is ignited before the first process is performed but the flame 31 ejected from the tip of the nozzle 32 of the point burner 30 does not contact the vial 10 at the standby position.

The heating power of the flame 31 ejected from the tip of the point burner 30 is controllable by a flow rate control device. In the first process, the heating power of the flame 31 ejected from the tip of the point burner 30 is adjusted to be weaker than the heating power of the flame 31 applied to the inner surface 15 of the vial 10 in the third process. In the first process, the heating power of the flame 31 ejected from the tip of the point burner 30 is not required to have strength sufficient for performing fire blasting of the vial 10 and is preferably weaker than the heating power of the flame 31 applied to the inner surface 15 of the vial 10 in the third process.

As illustrated in FIG. 4(B) and FIG. 4(C), the point burner 30 at the standby position is rotated by the rotating device 41 to a position where the axis line of the nozzle 32 is parallel to the axis line of the vial 10. In connection with the rotation of the point burner 30, the flame 31 ejected from the tip of the point burner 30 also descends in an arc. The flame 31 ejected from the tip of the point burner 30 moves while contacting a central portion in the left and right direction 102 of the shielding plate 51 from the upper side to the lower side. Herein, when it is supposed that the shielding plate 51 is not present, the rotation path of the flame 31 overlaps with the mouth portion 13 of the vial 10 placed on the roller pair 60. However, the flame 31 ejected from the tip of the point burner 30 is blocked by the shielding plate 51, and therefore the flame 31 does not contact the mouth portion 13, for example, of the vial 10. When the point burner 30 is rotated to the position illustrated in FIG. 4(C), the axis line of the nozzle 32 is parallel to the axis line of the vial 10 and the tip of the nozzle 32 is substantially aligned with the center of the opening 16 of the vial 10. Herein, the tip of the point burner 30 is located below relative to the lower end of the shielding plate 51 and a part of the flame 31 ejected from the tip of the point burner 30 advances into the internal space 14 of the vial 10 through the mouth portion 13.

[Second Process]

Figure 5:
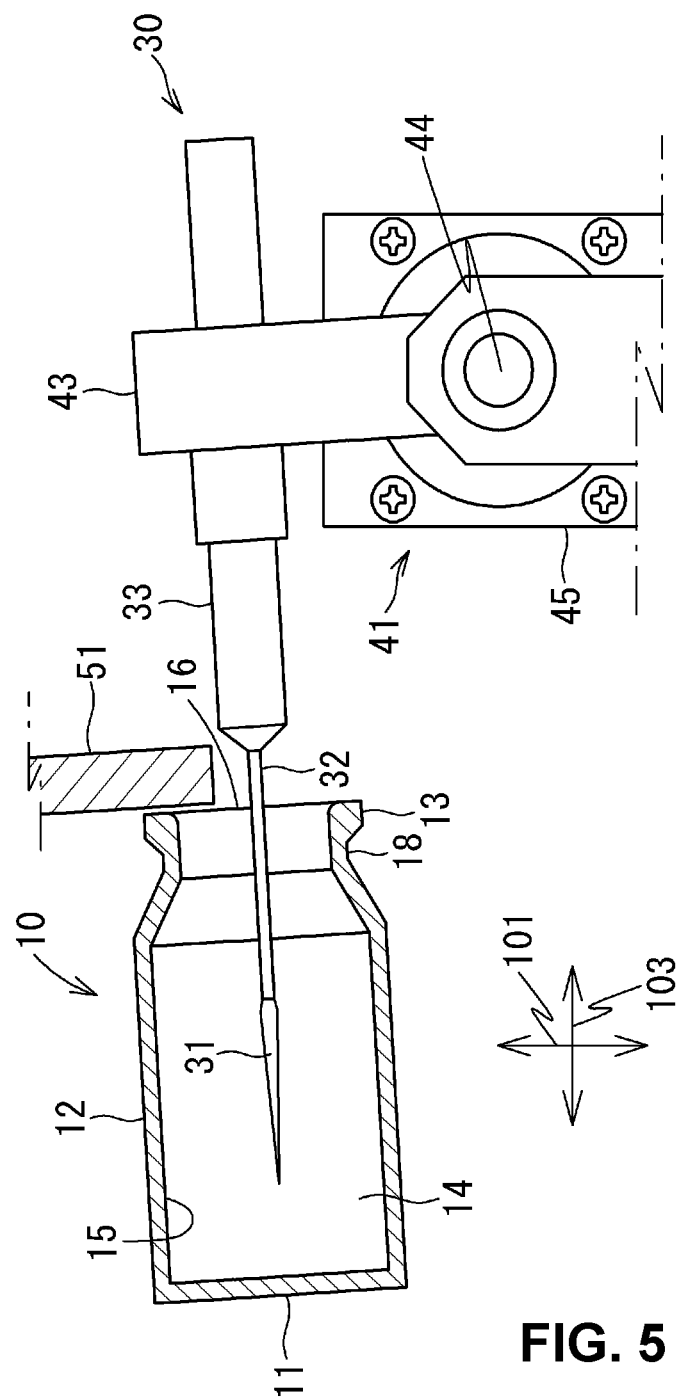
FIG. 5 is a view illustrating a state where the nozzle 32 of the point burner 30 is inserted into the internal space 14 of the vial 10 in the second process.

In the second process, the heating power of the flame 31 ejected from the tip of the point burner 30 is adjusted to be weaker than the heating power of the flame 31 applied to the inner surface 15 of the vial 10 in the third process. As illustrated in FIG. 4(C), the ignited point burner 30 is rotated until the axis line of the nozzle 32 is parallel to the axis line of the vial 10, and then, in the second process, the ignited point burner 30 is slid along the horizontal direction (forward and backward direction 103) by the sliding device 42 in a direction where the nozzle 32 advances into the internal space 14 of the vial 10 with the nozzle 32 along a direction parallel to the axis line of the vial 10. Thus, as illustrated in FIG. 5, a tip portion of the nozzle 32 advances into the internal space 14 through the opening 16 of the vial 10.

[Third Process]

Figure 6:
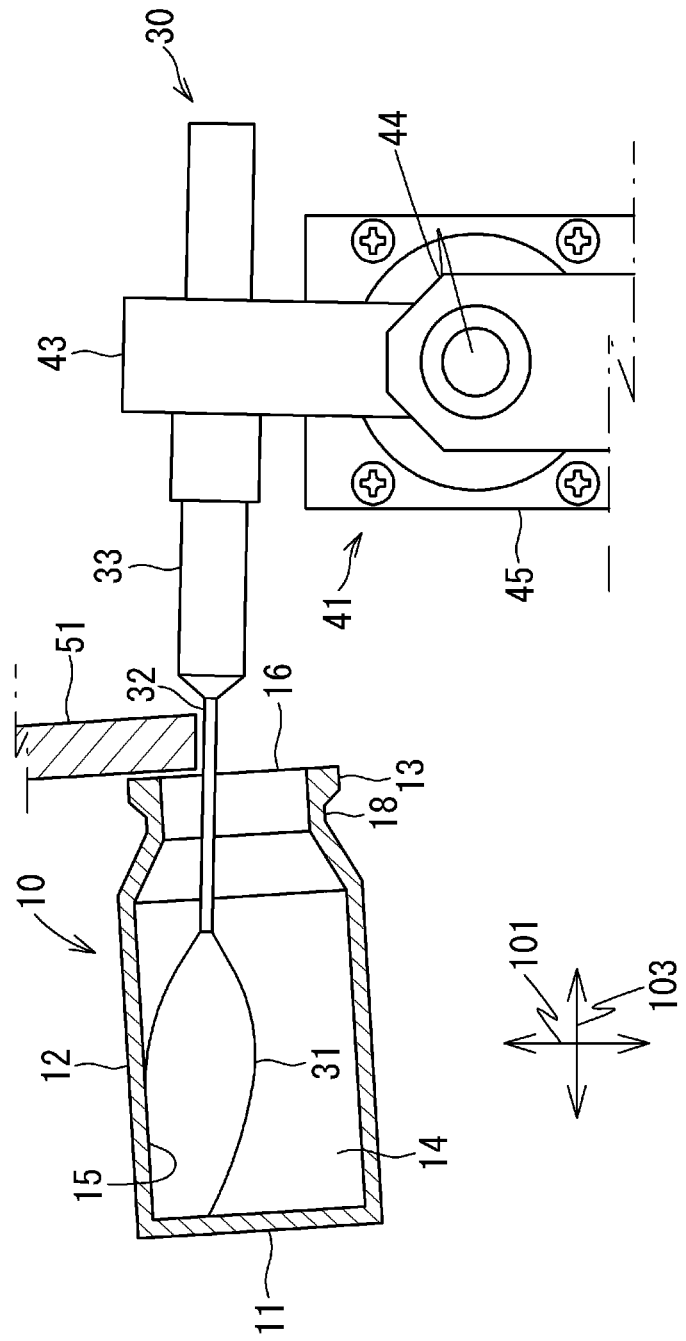
FIG. 6 is a view illustrating, for example, the point burner 30 in the third process.

As illustrated in FIG. 6, in the third process, the point burner 30 is rotated by the rotating device 41 so that the tip of the nozzle 32 faces the vicinity of the upper end of the bottom portion 11 of the inner surface 15 of the vial 10. By the rotation, the axis line of the nozzle 32 of the point burner 30 is tilted with respect to the horizontal direction (forward and backward direction 103) so that that the tip thereof is located above relative to the base end. In this state, the heating power of the flame 31 ejected from the tip of the point burner 30 is adjusted to have strength sufficient for performing fire blasting of the vial 10. As the heating power of the flame 31 ejected from the tip of the point burner 30, strength is required which allows the removal of alkaline components and the like contained in a region deteriorated by processing to the outside of the vial 10. The flame 31 ejected from the tip of the point burner 30 is applied to the inner surface 15 of the vial 10. By the rotation of the roller pair 60, the vial 10 rotates around the axis line with the axis line along the horizontal direction (forward and backward direction 103). Thus, the flame 31 ejected from the tip of the point burner 30 is successively applied in the circumferential direction of the inner surface 15 of the vial 10. Thus, the region deteriorated by processing generated in the inner surface 15 of the vial 10 is removed. The processing in which the region deteriorated by processing is removed by the flame 31 ejected from the tip of the point burner 30 is referred to as fire blasting.

[Fourth Process]

In the fourth process, the heating power of the flame 31 ejected from the tip of the point burner 30 is adjusted to be weaker than the heating power of the flame 31 applied to the inner surface 15 of the vial 10 in the third process. As illustrated in FIG. 5, the point burner 30 is rotated by the rotating device 41 until the axis line of the nozzle 32 is parallel to the axis line of the vial 10. Subsequently, due to the fact that the point burner 30 is slid by the sliding device 42 in a direction opposite to the direction in the second process described above, i.e., a direction where the point burner 30 is separated from the vial 10, the nozzle 32 moves to the outside from the internal space 14 through the opening 16 of the vial 10 (state illustrated in FIG. 4(C)).

[Fifth Process]

In the fifth process, the heating power of the flame 31 ejected from the tip of the point burner 30 is adjusted to be weaker than the heating power of the flame 31 applied to the inner surface 15 of the vial 10 in the third process. In the fifth process, the point burner 30 is rotated to the standby position illustrated in FIG. 4(A) from the position illustrated in FIG. 4(C). In the process in which the point burner 30 is rotated, the flame 31 ejected from the tip of the point burner 30 is blocked by the shielding plate 51 as illustrated in FIG. 4(B). Therefore, the flame 31 ejected from the tip of the point burner 30 does not contact the vial 10 in the rotation.

[Operational Effects of this Embodiment]

According to this embodiment, due to the fact that the flame 31 ejected from the tip of the point burner 30 is applied to the region deteriorated by processing in the inner surface 15 of the vial 10 in the third process, the region deteriorated by processing is removed from the inner surface 15 of the vial 10. The flame 31 having heating power weaker than the heating power of the flame 31 of the point burner 30 applied to the inner surface of the vial 10 in the third process is ejected from the tip of the point burner 30 in the second process and the fourth process. Therefore, when the tip of the point burner 30 passes through the opening 16 of the vial 10, the quantity of heat added to the vicinity of the opening 16, such as the neck portion 18 of the vial 10, is reduced.

Moreover, in the first process and the fifth process, the shielding plate 51 prevents the flame 31 from directly contacting the vicinity of the opening 16 of the vial 10. Thus, the generation of a crack in the vial 10 is prevented.

Moreover, the vial 10 is supported so that the opening of the vial 10 faces upward relative to the horizontal direction forward and backward direction 103) in each process and the point burner 30 is moved with respect to the vial 10 with the nozzle 32 configuring the tip of the point burner 30 along a direction parallel to the axis line of the vial 10 at least in the second process and the fourth process. Therefore, the tip of the point burner 30 is moved in parallel to the axial direction of the vial 10 between the outside and the internal space 14 of the vial 10. The flame 31 ejected from the tip of the point burner 30 is ejected in parallel to the axial direction of the vial 10. The flame 31 is ejected in parallel to the axial direction of the vial 10 when the tip of the point burner 30 passes through the vicinity of the neck portion 18 of the vial 10, and therefore the flame 31 is prevented from contacting the inner surface near the opening 16, such as the neck portion 18, of the vial 10.

In the third process, the vial 10 is supported by the one roller pair 60 and the vial 10 is rotated around the axis line of the vial 10 by the rotation of the roller pair 60 while applying the flame 31 ejected from the tip of the point burner 30 to the inner surface 15 of the vial 10. Therefore, the flame 31 ejected from the tip of the point burner 30 is uniformly applied in the circumferential direction in the inner surface 15 of the vial 10.

Moreover, the shielding plate 51 capable of blocking the flame 31 ejected from the tip of the point burner 30 is used as the shielding plate 51 and the shielding plate 51 is located between a part of the edge portion 17 defining the opening 16 of the vial 10 and the tip of the point burner 30 in the first process and the fifth process, and therefore a shielding mechanism having a simple configuration is realized.

Moreover, the tip of the point burner 30 is moved with respect to the vial 10 by rotating the point burner 30 in the first process and the fifth process, and therefore the movement distance in the horizontal direction (forward and backward direction 103) of the point burner 30 becomes short in the first process and the fifth process. More specifically, the movement distance of the point burner 30 with respect to the axial direction of the vial 10 is designed to be short in the first process and the fifth process.

[Modification]

In this embodiment, the shielding plate 51 is employed as the shielding mechanism. However, even in an embodiment of not employing the shielding mechanism, the operational effects of the present invention are demonstrated. For example, by adjusting the heating power of the flame 31 ejected from the tip of the point burner 30 in the first process and the fifth process to be weaker than the heating power of the flame 31 applied to the inner surface 15 of the vial 10 in the third process instead of providing the shielding mechanism, the quantity of heat added to the vicinity of the mouth portion 13 can be reduced due to the fact that the flame 31 contacts the vicinity of the mouth portion 13 of the vial 10 when the point burner 30 is rotated in the first process and the fifth process.

Moreover, the shielding mechanism is not limited to the shielding plate 51 and a mechanism may be acceptable which prevents the flame 31 ejected from the point burner 30 from contacting the vial 10. For example, an air current flowing in a direction crossing the axis line of the vial 10 may be formed, in place of the shielding plate 51, near the mouth portion 13 of the vial 10 to prevent the flame 31 ejected from the tip of the point burner 30 from reaching the vial 10 without extinguishing the flame 31 in the first process and the fifth process.

Moreover, the shape of the shielding plate 51 is not particularly limited and other shapes may be acceptable insofar as the flame 31 ejected from the tip of the point burner 30 is prevented from contacting the vicinity of the opening 16 of the vial 10. Moreover, the shape of the shielding plate 51 is not limited to a flat plate shape and may be a shape having a curved surface along the rotation path of the tip of the nozzle 32, for example.

Moreover, although the vial 10 is molded using a common vertical molding device in the container molding process, other molding methods may be employed. For example, the vial 10 may be molded by molding a glass container from a glass tube held with the axis line of the glass tube along the horizontal direction (i.e., using a so-called horizontal molding device).

Moreover, the glass container is not limited to the vial 10 and may be a glass container of another shape. For example, the glass container may be an ampule-shaped glass container or may be an intermediate article in which the vial 10 is not completely molded e.g., an intermediate article in which the bottom portion 11 is molded but the mouth portion 13 is not molded, for example.

Moreover, the movement to the standby position of the point burner 30 is not limited to the rotation. For example, in the first process and the fifth process, the point burner 30 may be moved to the standby position and the position illustrated in FIG. 4(C) by moving the point burner 30 with the nozzle 32 along the horizontal direction in the vertical direction 101. Moreover, the point burner 30 with the nozzle 32 along the horizontal direction may be slid only in the forward and backward direction 103. In this case, the point burner 30 is moved along the forward and backward direction 103 between the position illustrated in FIG. 4(C) and the standby position which is located on the right side relative to the position illustrated in FIG. 4(C) and in which the flame 31 ejected from the tip of the point burner 30 does not contact the vial 10.

Moreover, the point burner 30 is rotated by the rotating device 41 so that the axial direction of the nozzle 32 of the point burner 30 tilts with respect to the horizontal direction in order to apply the flame 31 ejected from the tip of the point burner 30 to the region deteriorated by processing in the inner surface 15 of the vial 10 in the third process. However, the flame 31 ejected from the tip of the point burner 30 may be applied to the region deteriorated by processing in the inner surface 15 of the vial 10 by further tilting the axial direction of the vial 10 with respect to the horizontal direction in a state where the point burner 30 is fixed.

Moreover, the inner surface 15 of the vial 10 with which the flame 31 ejected from the tip of the point burner 30 is applied is not necessarily required to be the entire inner surface 15 in the third process. For example, when the region deteriorated by processing is present only near the bottom portion 11 of the inner surface 15 of the vial 10, the flame 31 may be applied only to the vicinity of bottom portion 11 of the inner surface 15.

Moreover, with respect to the roller pair 60, the axis line of the roller pair 60 tilts with respect to the horizontal direction (forward and backward direction 103) so that the surface facing the point burner 30 is located above relative to the opposite surface. However, the roller pair 60 may be located so that the axis line of the roller pair 60 is directed in the horizontal direction (forward and backward direction 103). In connection therewith, the point burner 30 may be moved in the horizontal direction (forward and backward direction 103) in a state where the axis line of the point burner 30 is fixed to be directed in the horizontal direction (forward and backward direction 103) in the second process and the fourth process.

Moreover, the roller pair 60 is used in order to rotate the vial 10 around the axial direction. However, a device rotating the vial 10 is not limited to the roller pair 60. For example, a chuck device holding and rotating the vial 10 may be used.

EXAMPLES

Hereinafter, Examples of the present invention are described.

[Process of Molding Vial 10]

Vials 10 were molded by the container molding process described in the embodiment described above. The vials 10 were molded by processing a glass tube using a standard vertical molding device. The vials formed in Examples have a size of an outer diameter of 18 mm, an overall length of 33 mm, and a capacity of 3 mL.

Example 1

20 molded vials 10 were subjected to the fire blast process described in the embodiment described above. The vials 10 were rotated by the roller pair 60. The flow rates of gas and oxygen introduced into the point burner 30 were adjusted by a flow rate control device. In the first process and the fifth process, the gas flow rate was adjusted to 0.3 L/min and the oxygen flow rate was adjusted to 0.7 L/min. In the second process and the fourth process, the gas flow rate was adjusted to 0.4 L/min and the oxygen flow rate was adjusted to 0.9 L/min. The fire blasting in the third process was performed for 10 to 30 seconds. In the third process, the gas flow rate was adjusted to 0.4 or more L/min and the oxygen flow rate was adjusted to 0.9 or more L/min.

Example 2

20 molded vials 10 were subjected to the fire blast process in the same manner as in Example 1, except not using the shielding plate 51.

Comparative Example 19 molded vials 10 were subjected to the fire blast process in the same manner as in Example, except fixing the gas and oxygen flow rates during the fire blast process and not using the shielding plate 51. In the fire blast process, the oxygen flow rate was adjusted to 0.6 L/min and the oxygen flow rate was adjusted to 1.34 L/min. More specifically, the gas and oxygen flow rates were adjusted to be fixed from the first process to the fifth process.

[Evaluation]

When the vials 10 obtained in Example 1, Example 2, and Comparative Example were compared, no cracks were observed in the 20 vials 10 obtained in Example 1. Among the 20 vials 10 obtained in Example 2, a crack was observed in the neck portion 18 in one vial 10 but no cracks were observed in the other 19 vials 10. On the other hand, among the 19 vials 10 obtained in Comparative Example, a crack was observed in the neck portion 18 in 9 vials 10 but no cracks were observed in the other 10 vials 10. Therefore, the generation of a crack was clearly reduced in both Example 1 and Example 2 as compared with Comparative Example. Moreover, it was confirmed that, when the shielding plate 51 was used as in Example 1, the generation of a crack is further prevented as compared with the case where the shielding plate 51 was not used as in Example 2.

REFERENCE SIGNS LIST

10 Vial (Glass container)
11 Bottom portion
13 Mouth portion
15 Inner surface
16 Opening
17 Edge portion
18 Neck portion
30 Point burner
31 Flame
32 Nozzle
51 Shielding plate (Shielding mechanism)
60 Roller pair
103 Forward and backward direction

The invention claimed is:

1. A method for reducing elution of alkaline components from an inner surface of a borosilicate glass container during manufacture of the borosilicate glass container, comprising:
a first step of shielding an edge portion of a mouth portion of the borosilicate glass container from a flame of an ignited point burner as a tip of the ignited point burner moves across said edge portion from a position away from the borosilicate glass container to a position where the flame enters an opening in the the mouth portion of the the borosilicate glass container;
after the first step, a second step of inserting the tip of the ignited point burner into an internal space of the borosilicate glass container through the opening;
a third step of applying the flame ejected from the tip of the point burner to an inner surface of the borosilicate glass container while holding the tip of the point burner in the internal space of the borosilicate glass container;
a fourth step of moving the tip of the ignited point burner out from the internal space of the borosilicate glass container through the opening to a position where the flame is aligned with the opening in the mouth portion of the the borosilicate glass container; and
a fifth step of shielding the edge portion of the mouth portion of the borosilicate glass container from the flame of the ignited point burner as the tip of the ignited point burner moves across the edge portion from the position where the flame is aligned with the opening in the mouth portion of the the borosilicate glass container to another position away from the borosilicate glass container.

2. The method of claim 1, wherein the flame ejected from the point burner at least in the second step and the fourth step has heating power weaker than heating power of the flame of the point burner applied to the inner surface of the borosilicate glass container in the third step.

3. The method according to claim 1, wherein
the borosilicate glass container is supported so that the opening of the borosilicate glass container faces upward relative to a horizontal direction in each of the above-described steps, and
the point burner is moved with respect to the borosilicate glass container with a nozzle configuring the tip of the point burner along a direction parallel to an axis line of the borosilicate glass container at least in the second step and the fourth step.

4. The method according to claim 3, wherein
in the third step, the borosilicate glass container is supported with a pair of rollers, and
the borosilicate glass container is rotated by rotation of the rollers while applying the flame ejected from the tip of the point burner to the inner surface of the borosilicate glass container.

5. The method according to claim 1, further comprising, prior to the first step, positioning a shield between said edge portion and said tip capable of blocking the flame ejected from the tip of the point burner.

6. The method according to claim 1, wherein the tip of the point burner is moved with respect to the borosilicate glass container by rotating the point burner about an axis so that the tip sweeps along an arc during the first step and the fifth step.

7. A method for fire blasting an inner surface of a glass container during manufacture of the glass container, comprising:
a first step of shielding an edge portion of a mouth portion of the borosilicate glass container from a flame of an ignited point burner as a tip of the ignited point burner moves across said edge portion from a position away from the borosilicate glass container to a position where the flame enters an opening in the the mouth portion of the the borosilicate glass container;
after the first step, a second step of inserting the tip of the ignited point burner into an internal space of the borosilicate glass container through the opening;
a third step of fire blasting an inner surface of the borosilicate glass container while holding the tip of the point burner in the internal space of the borosilicate glass container; and
a fourth step of moving the tip of the ignited point burner out from the internal space of the borosilicate glass container through the opening to a position where the flame is aligned with the opening in the mouth portion of the the borosilicate glass container.

8. The method of claim 7, further comprising:
a fifth step of shielding the edge portion of the mouth portion of the borosilicate glass container from the flame of the ignited point burner as the tip of the ignited point burner moves across the edge portion from the position where the flame is aligned with the opening in the mouth portion of the the borosilicate glass container to another position away from the borosilicate glass container.

9. The method of claim 7, wherein the flame ejected from the point burner at least in the second step and the fourth step has heating power weaker than heating power of the flame of the point burner applied to the inner surface of the borosilicate glass container in the third step.

10. The method according to claim 7, further comprising, prior to the first step, positioning a shield between said edge portion and said tip capable of blocking the flame ejected from the tip of the point burner.

11. The method according to claim 7, wherein the tip of the point burner is moved with respect to the borosilicate glass container by rotating the point burner about an axis so that the tip sweeps along an arc during the first step.

* * * * *